US011984650B2

(12) United States Patent
Kim et al.

(10) Patent No.: US 11,984,650 B2
(45) Date of Patent: May 14, 2024

(54) ANTENNA SYSTEM MOUNTED IN VEHICLE

(71) Applicant: LG Electronics Inc., Seoul (KR)

(72) Inventors: Yongkon Kim, Seoul (KR); Sunin Jeong, Seoul (KR)

(73) Assignee: LG Electronics Inc., Seoul (KR)

(*) Notice: Subject to any disclaimer, the term of this patent is extended or adjusted under 35 U.S.C. 154(b) by 379 days.

(21) Appl. No.: 17/344,562

(22) Filed: Jun. 10, 2021

(65) Prior Publication Data

US 2021/0305688 A1 Sep. 30, 2021

Related U.S. Application Data

(63) Continuation of application No. PCT/KR2018/015630, filed on Dec. 10, 2018.

(51) Int. Cl.
*H01Q 1/32* (2006.01)
*H01Q 1/02* (2006.01)
(Continued)

(52) U.S. Cl.
CPC ............. *H01Q 1/3275* (2013.01); *H01Q 1/02* (2013.01); *H01Q 1/241* (2013.01);
(Continued)

(58) Field of Classification Search
CPC ........ H01Q 1/3275; H01Q 1/02; H01Q 1/241; H01Q 1/3208; H01Q 1/3291; H01Q 1/38;
(Continued)

(56) References Cited

U.S. PATENT DOCUMENTS 6,184,832 B1* 2/2001 Geyh .................. H01Q 21/065
343/700 MS
10,020,866 B2 7/2018 Jidhage
(Continued)

FOREIGN PATENT DOCUMENTS

CN 107251444 10/2017
JP 2004056773 2/2004
(Continued)

OTHER PUBLICATIONS

Kim et al. (The English translation of WO 2018043808 A1) (Year: 2018).*

(Continued)

*Primary Examiner* — Seung H Lee
(74) *Attorney, Agent, or Firm* — Fish & Richardson P.C.

(57) ABSTRACT

An antenna system mounted in a vehicle according to the present invention may include: a first antenna system in which multiple first antenna elements configured to transmit and receive a first signal according to a first communication system perform multi-input multi-output (MIMO); and a second antenna system in which multiple second antenna elements configured to transmit and receive a second signal according to a second communication system perform beamforming, wherein the multiple first antenna elements and the multiple second antenna elements are arranged on the same circuit board, so as to provide an antenna arrangement structure in which the isolation characteristic between antenna elements is optimized, for a flat vehicular antenna including an LTE antenna system and a 5G antenna system.

20 Claims, 10 Drawing Sheets

(51) Int. Cl.
  *H01Q 1/24* (2006.01)
  *H01Q 1/38* (2006.01)
  *H01Q 5/25* (2015.01)
  *H01Q 21/00* (2006.01)
  *H04B 7/0413* (2017.01)

(52) U.S. Cl.
  CPC ......... *H01Q 1/3208* (2013.01); *H01Q 1/3291* (2013.01); *H01Q 1/38* (2013.01); *H01Q 5/25* (2015.01); *H01Q 21/0025* (2013.01); *H04B 7/0413* (2013.01)

(58) Field of Classification Search
  CPC ........ H01Q 5/25; H01Q 21/0025; H01Q 5/40; H01Q 9/0407; H01Q 9/42; H01Q 21/06; H01Q 21/28; H01Q 21/061; H04B 7/0413; H04B 7/0617
  See application file for complete search history.

(56) References Cited

U.S. PATENT DOCUMENTS

| | | | |
|---|---|---|---|
| 10,171,136 B2 | 1/2019 | Park et al. | |
| 10,306,691 B2 | 5/2019 | Park et al. | |
| 10,469,136 B2 | 11/2019 | Kim et al. | |
| 10,555,363 B2 | 2/2020 | Park et al. | |
| 2003/0117328 A1 | 6/2003 | Sievenpiper et al. | |
| 2008/0273579 A1 | 11/2008 | Rofougaran et al. | |
| 2009/0213019 A1* | 8/2009 | Schoebel | H01Q 1/3283 343/872 |
| 2013/0207854 A1 | 8/2013 | Ryu | |
| 2016/0248451 A1 | 8/2016 | Weissman et al. | |
| 2016/0345257 A1 | 11/2016 | Park et al. | |
| 2018/0123632 A1 | 5/2018 | Posselt et al. | |
| 2018/0219600 A1 | 8/2018 | Kim et al. | |
| 2018/0226367 A1 | 8/2018 | Babcock et al. | |
| 2018/0227023 A1 | 8/2018 | Kim et al. | |
| 2018/0263025 A1 | 9/2018 | Kim et al. | |

FOREIGN PATENT DOCUMENTS

| | | |
|---|---|---|
| KR | 1020180025066 | 3/2018 |
| KR | 1020180042266 | 4/2018 |
| WO | WO2017076750 | 5/2017 |
| WO | WO 2018043808 | 3/2018 |

OTHER PUBLICATIONS

Office Action in U.S. Appl. No. 16/380,965, dated Jun. 23, 2020, 5 pages.
Office Action in U.S. Appl. No. 16/380,965, dated May 21, 2020, 11 pages.
Office Action in Chinese Appln. No. 201880100109.9, dated Apr. 29, 2023, 15 pages (with English translation).

* cited by examiner (a)

| S-PARAMETER | S21(LTE 1 – LTE 2) | S31(LTE 1 – LTE 3) | S41(LTE 1 – LTE 4) |
|---|---|---|---|
| ISOLATION(MAX) | −15dB @ 960MHz | −11.6dB @ 960MHz | −22.3dB @ 960MHz |

| S-PARAMETER | S32(LTE 2 – LTE 3) | S42(LTE 2 – LTE 4) | S43(LTE 3 – LTE 4) |
|---|---|---|---|
| ISOLATION(MAX) | −19.8dB @ 1710MHz | −14.1dB @ 791MHz | −13.0dB @ 960MHz |

ANTENNA SYSTEM MOUNTED IN VEHICLE

CROSS-REFERENCE TO RELATED APPLICATIONS

This application is a continuation of International Application No. PCT/KR2018/015630, filed on Dec. 10, 2018, which is hereby expressly incorporated by reference into the present application.

TECHNICAL FIELD

The present invention relates to an antenna system loaded in a vehicle, and more particularly, to an antenna system mounted in a vehicle for providing communication services by transmitting and receiving a plurality of communication signals.

BACKGROUND

Terminals may be divided into mobile/portable devices and stationary devices according to mobility. Also, the mobile terminals may be classified into handheld types and vehicle mount types according to whether or not a user can directly carry.

Functions of mobile terminals have been diversified. Examples of such functions include data and voice communications, capturing images and video via a camera, recording audio, playing music files via a speaker system, and displaying images and video on a display unit. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, a mobile terminal can be allowed to capture still images or moving images, play music or video files, play games, receive broadcast and the like, so as to be implemented as an integrated multimedia player.

Efforts are ongoing to support and increase the functionality of mobile terminals. Such efforts include software and hardware improvements, as well as changes and improvements in the structural components.

In recent years, there is an increasing need to provide communication services and multimedia services by mounting such mobile terminals in vehicles. Meanwhile, there is a need for a fifth generation (5G) communication service, which is a next generation communication service, as well as existing communication services such as LTE (Long Term Evolution) and the like in relation to communication services.

In this regard, discussion on the specification of the 5G communication service has not been completed, and an antenna system and a communication system for realizing such a service in the vehicle have not been discussed. In addition, a detailed method for implementing a flat antenna in relation to a method of loading a vehicle antenna system in a vehicle has not been presented.

In addition, the vehicle antenna system needs to support not only the 5G communication system but also communication services such as LTE, which is an existing communication service. In this regard, LTE supports a Multi-Input Multi-Output (MIMO) mode for improving transmission speed. However, in order to support such a MIMO mode, isolation between LTE antennas is important. However, there is a problem that a method of ensuring sufficient isolation between the LTE antennas while maintaining sizes mountable in the vehicle has not been disclosed in detail.

In addition, when an antenna of a 4G communication system such as LTE and an antenna of a 5G communication system are arranged, isolation between them is also important. In this regard, it is particularly important in LTE re-farming in which an antenna of a 5G communication system operates in a sub-6 band of 6 GHz or less or partially uses a frequency band of a 4G communication system. Therefore, there is a problem in that a method of ensuring sufficient isolation between antennas of a plurality of communication systems, in consideration of their sizes loadable in a vehicle, has not been specifically presented.

SUMMARY

One aspect of the present invention is to provide a flat vehicle antenna capable of providing next generation communication services as well as existing mobile communication services, and an antenna arrangement structure having optimized isolation.

Another aspect of the present invention is to provide communication services using a plurality of antennas for providing a plurality of communication services by effectively arranging the plurality of antennas on a vehicle antenna system structure.

An antenna system loaded in a vehicle according to the present invention may include a first antenna system to perform Multi Input Multi Output (MIMO) by use of a plurality of first antenna elements provided therein to transmit and receive a first signal according to a first communication system, and a second antenna system to perform beam-forming by use of a plurality of second antenna elements configured to transmit and receive a second signal according to a second communication system, wherein the plurality of first antenna elements and the plurality of second antenna elements may be disposed on the same circuit board, whereby an antenna arrangement structure with optimized isolation among antenna elements in a flat vehicle antenna having an LTE antenna system and a 5G antenna system can be provided.

According to one embodiment, the first antenna system may perform 4×4 MIMO, and the plurality of first antenna elements may be disposed at a left upper end, a right upper end, a left lower end, and a right lower end of the circuit board.

According to one embodiment, the plurality of first antenna elements may include first to fourth LTE antennas, the first and second LTE antennas disposed at the left upper end and the right upper end of the circuit board may be symmetrical with respect to a center line between the first and second LTE antennas. At this time, the first and second LTE antennas may have an off-center feeding form in which feeding points thereof are shifted far away from each other so as to enhance isolation.

According to one embodiment, at least one of the third and fourth LTE antennas disposed at the left lower end and the right lower end of the circuit board may be partially shifted to the left or right relative to the first and second LTE antennas. At this time, the third antenna may be disposed in a curved region and a left region other than a linear region of a lower end portion.

According to one embodiment, the antenna system may further include a C2X antenna disposed between regions where the first and second LTE antennas are disposed.

According to one embodiment, the antenna system may further include first and second WiFi antennas disposed at a predetermined distance from the third and fourth LTE antennas disposed at the lower left and lower right ends of the circuit board. At this time, the first and second WiFi antennas may be disposed at a left center and a lower center of the circuit board.

According to one embodiment, the plurality of second antenna elements may include first to fourth array antennas disposed in a center region of the circuit board surrounded by the first to fourth LTE antennas. At this time, the first to fourth array antennas may be disposed at a left center, a right center, an upper center and a lower center to cover predetermined regions in an azimuth direction.

According to one embodiment, the antenna system may further include an SDARS antenna and a GNSS antenna disposed at a predetermined distance from the first and second array antennas disposed at the left center and the right center.

According to one embodiment, the first to fourth LTE antennas may set transmission power of the first signal to a threshold value or less when the signal is received through the GNSS antenna.

According to one embodiment, the first antenna system and the second antenna system may be disposed on an antenna PCB corresponding to the circuit board having a polygonal structure. At this time, the antenna PCB may be provided with an integrated module disposed on a rear surface thereof, and the integrated module may be provided therein with a modem module, a connectivity module, and a millimeter wave module.

According to one embodiment, the antenna PCB may be provided with a top cover disposed on an upper portion thereof, and the antenna PCB may be provided with a main PCB disposed on a lower portion thereof. On the other hand, the main PCB may be provided with a bottom cover disposed on a lower portion thereof, and the bottom cover may be provided with a backup battery detachably disposed thereon.

According to one embodiment, the antenna system provided in the vehicle may be disposed on a roof of the vehicle or within a roof structure of the vehicle, and at least part of the roof structure may be made of a nonmetal.

According to one embodiment, the antenna PCB may be further provided with a modem processor, a Bluetooth (BT)/WiFi module, and a C2X module in addition to the first antenna system and the second antenna system. In addition, the main board may be provided with an application processor, an Ethernet switch, a power management unit, and a vehicle network connector. Also, the antenna system may be provided with a 2×2 LTE MIMO input port and a C2X antenna port as wireless interfaces, and provided with an Ethernet interface, an emergency call button interface, an airbag interface, an emergency call speaker interface and a microphone interface as wired interfaces.

An antenna system loaded on a vehicle according to another aspect of the present invention may include a plurality of first antenna elements to transmit and receive a first signal according to a first communication system, and a plurality of array antennas to transmit and receive a second signal according to a second communication system, wherein the plurality of first antenna elements and the plurality of array antennas may be disposed on an antenna PCB as the same circuit board.

According to one embodiment, the plurality of first antenna elements may include first to fourth LTE antennas, and perform 4×4 MIMO with a base station. At this time, the plurality of first to fourth LTE antennas may be disposed at a left upper end, a right upper end, a left lower end, and a right lower end of the antenna PCB.

According to one embodiment, the first and second LTE antennas disposed at the left upper end and the right upper end of the antenna PCB may be symmetrical with respect to a center line between the first and second LTE antennas. At this time, the first and second LTE antennas may have an off-center feeding form in which feeding points thereof are shifted far away from each other so as to enhance isolation.

According to one embodiment, at least one of the third and fourth LTE antennas disposed at the left lower end and the right lower end of the antenna PCB may be partially shifted to the left or right relative to the first and second LTE antennas. At this time, the third antenna may be disposed in a curved region and a left region other than a linear region of a lower end portion.

According to one embodiment, the plurality of array antennas that are first to fourth array antennas may be disposed in a center region of the antenna PCB surrounded by the first to fourth LTE antennas. On the other hand, the first to fourth array antennas may be disposed at a left center, a right center, an upper center and a lower center to cover predetermined regions in an azimuth direction.

According to one embodiment, the plurality of first antenna elements and the plurality of array antennas may be disposed on the antenna PCB having a polygonal structure. At this time, the antenna PCB may be provided with an integrated module disposed on a rear surface thereof, and the integrated module may be provided therein with a modem module, a connectivity module, and a millimeter wave module.

According to one embodiment, the antenna PCB may be provided with a top cover disposed on an upper portion thereof, and the antenna PCB may be provided with a main PCB disposed on a lower portion thereof. On the other hand, the main PCB may be provided with a bottom cover disposed on a lower portion thereof, and the bottom cover may be provided with a backup battery detachably disposed thereon.

Hereinafter, effects of an antenna system loaded in a vehicle and a method of controlling the same according to the present invention will be described.

According to at least one embodiment of the present invention, it is possible to provide an antenna arrangement structure in which isolation characteristics between antenna elements are optimized in a flat vehicle antenna having an LTE antenna system and a 5G antenna system.

In addition, according to at least one embodiment of the present invention, the present invention provides a module-type flat vehicle antenna system in which various basic structures of the flat vehicle antenna system can extend to an extended structure.

Further scope of applicability of the present invention will become apparent from the following detailed description. It should be understood, however, that the detailed description and specific examples, such as the preferred embodiment of the invention, are given by way of illustration only, since various changes and modifications within the spirit and scope of the invention will be apparent to those skilled in the art.

BRIEF DESCRIPTION OF THE DRAWINGS

FIG. 6 is a view illustrating isolation between a plurality of LTE antennas according to the present invention.

DETAILED DESCRIPTION

Figure 1:
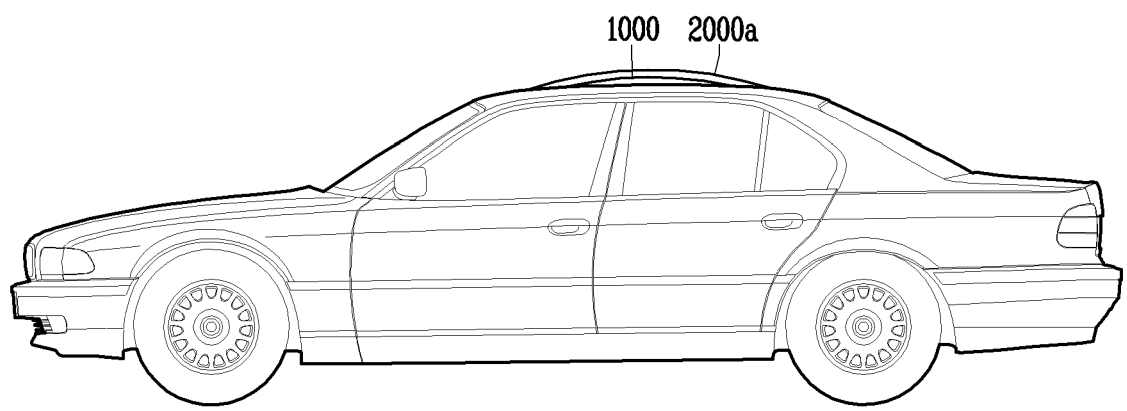
FIG. 1 is a view illustrating a structure for mounting an antenna system in a vehicle in a mobile terminal having the antenna system loaded in the vehicle.
Figure 1:
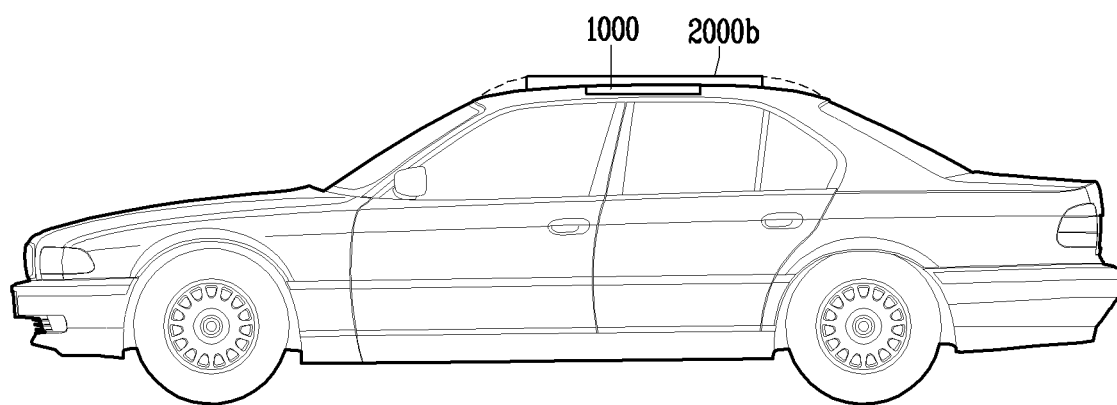

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

The mobile terminal described in this specification may include a mobile terminal mounted in a vehicle. Examples of the mobile terminal disclosed herein may include cellular phones, smart phones, laptop computers, digital broadcast terminals, personal digital assistants (PDAs), portable multimedia players (PMPs), navigators, slate PCs, tablet PCs, ultra books, wearable devices (for example, smart watches, smart glasses, head mounted displays (HMDs), etc.), and the like, which can be used in the vehicle if necessary.

On the other hand, the mobile terminal disclosed in this specification mainly refers to a vehicle terminal implemented by an antenna system mounted in a vehicle, but may also include a mobile terminal (electronic device) located inside a vehicle or possessed by a user aboard the vehicle.

FIG. 1 is a view illustrating a structure for mounting an antenna system in a vehicle in a mobile terminal having the antenna system loaded in the vehicle. In this regard, (a) of FIG. 1 shows a configuration in which the antenna system 1000 is loaded on a roof of the vehicle. On the other hand, (b) of FIG. 1 shows a structure in which the antenna system 1000 is loaded in a roof of a vehicle.

Referring to FIG. 1, in order to improve the appearance of the vehicle and to maintain a telematics performance at the time of collision, an existing shark fin antenna is replaced with a flat antenna of a non-protruding shape. In addition, the present invention proposes an integrated antenna of an LTE antenna and a 5G millimeter wave (mmWave) antenna considering fifth generation (5G) communication after 2020, while providing the existing mobile communication service (e.g., LTE). In this regard, the LTE antenna may be an LTE 4×4 MIMO (Multi-Input Multi-Output) antenna. In addition, the present invention proposes a package type antenna for enhancing durability of a patch antenna mounted inside from an impact.

Referring to (a) of FIG. 1, the antenna system 1000 is configured as a hexahedral structure and is disposed on a roof of the vehicle. In (a) of FIG. 1, a radome 2000a for protecting the antenna system 1000 from an external environment and external shocks while the vehicle travels may cover the antenna system 1000. The radome 2000a may be made of a dielectric material through which radio signals are transmitted/received between the antenna system 1000 and a base station.

Referring to (b) of FIG. 1, the antenna system 1000 may be disposed within a roof structure of the vehicle, and at least part of the roof structure may be made of a non-metallic material. At this time, the at least part of the roof structure 2000b of the vehicle may be realized by a non-metallic material, and may be made of a dielectric material through which radio signals are transmitted/received between the antenna system 1000 and the base station.

Meanwhile, the antenna system 1000 may be installed on a front or rear surface of the vehicle depending on applications other than the roof structure of the vehicle.

Figure 2:
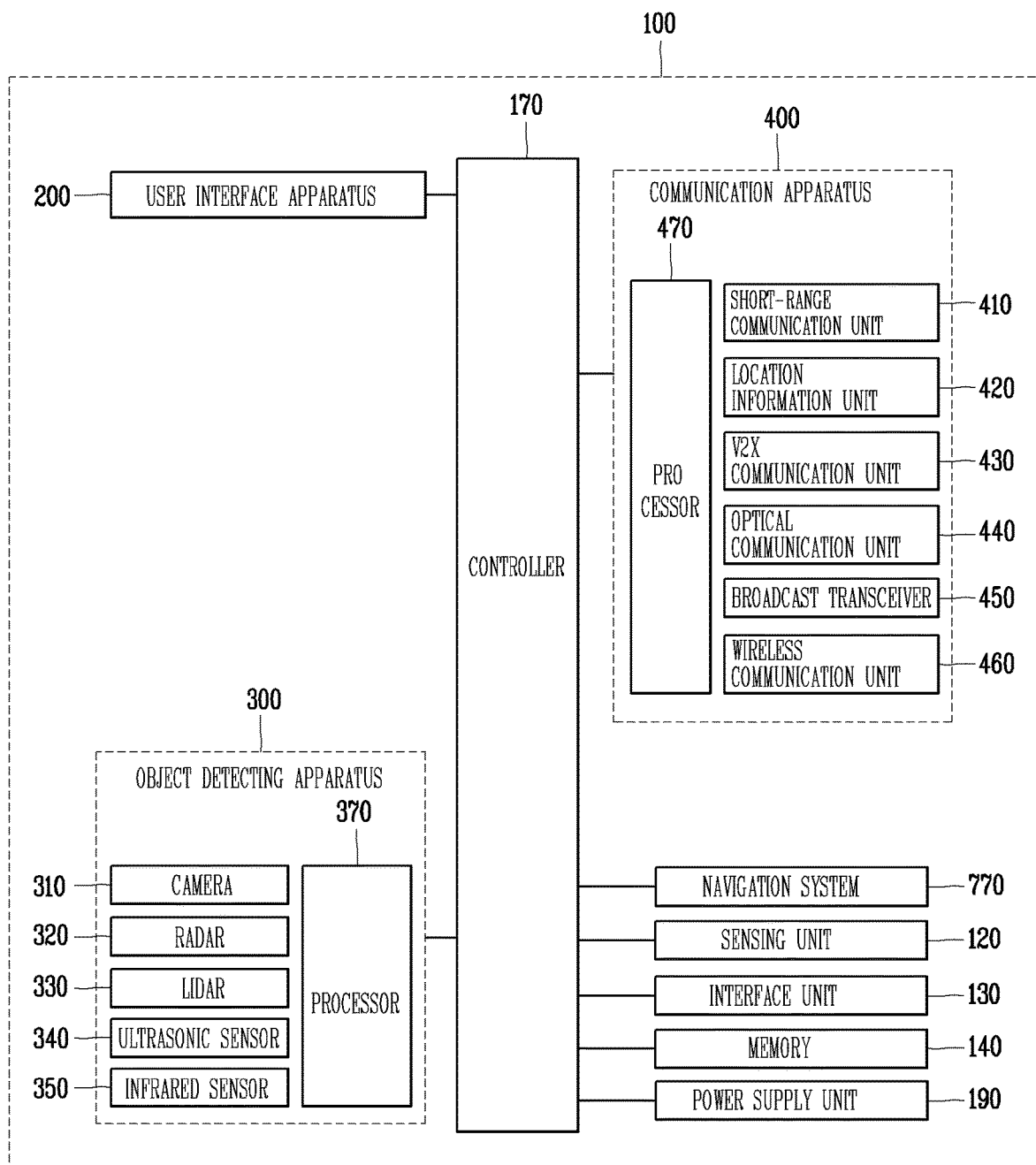
FIG. 2 is a block diagram illustrating a vehicle in accordance with an embodiment of the present invention.

FIG. 2 is a block diagram illustrating a vehicle in accordance with an embodiment of the present invention.

As illustrated in FIGS. 1 and 2, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous module into the manual mode based on driving environment information generated in the object detecting apparatus 300.

In an example, the vehicle 100 may be switched from the manual mode into the autonomous mode or from the autonomous module into the manual mode based on driving environment information received through a communication apparatus 400.

The vehicle 100 may be switched from the manual mode into the autonomous mode or from the autonomous module into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signal generated in a driving system 710, a parking exit system 740 and a parking system 750.

When the vehicle 100 is driven in the manual mode, the autonomous vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 2, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 200 may implement user interfaces (UIs) or user experiences (UXs) through the user interface apparatus 200.

The object detecting apparatus 300 is an apparatus for detecting an object located at outside of the vehicle 100.

The object may be a variety of objects associated with driving (operation) of the vehicle 100.

Meanwhile, objects may be classified into a moving object and a fixed object. For example, the moving object may be a concept including another vehicle and a pedestrian. The fixed object may be a concept including a traffic signal, a road and a structure, for example.

The object detecting apparatus 300 may include a camera 310, a radar 320, a LiDAR 330, an ultrasonic sensor 340, an infrared sensor 350 and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 400 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device. The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal and a data broadcast signal.

The wireless communication unit 460 is a unit that performs wireless communications with one or more communication systems through one or more antenna systems. The wireless communication unit 460 may transmit and/or receive a signal to and/or from a device in a first communication system through a first antenna system. In addition, the wireless communication unit 460 may transmit and/or receive a signal to and/or from a device in a second communication system through a second antenna system.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display apparatus for the vehicle may be referred to as a telematics apparatus or an Audio Video Navigation (AVN) apparatus.

The communication apparatus 400 may operate according to the control of the controller 170.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a posture, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

Meanwhile, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

The vehicle 100 related to the present invention can operate in any one of a manual driving mode and an autonomous driving mode. That is, the driving modes of the vehicle 100 may include the manual driving mode and the autonomous driving mode.

Figure 3:
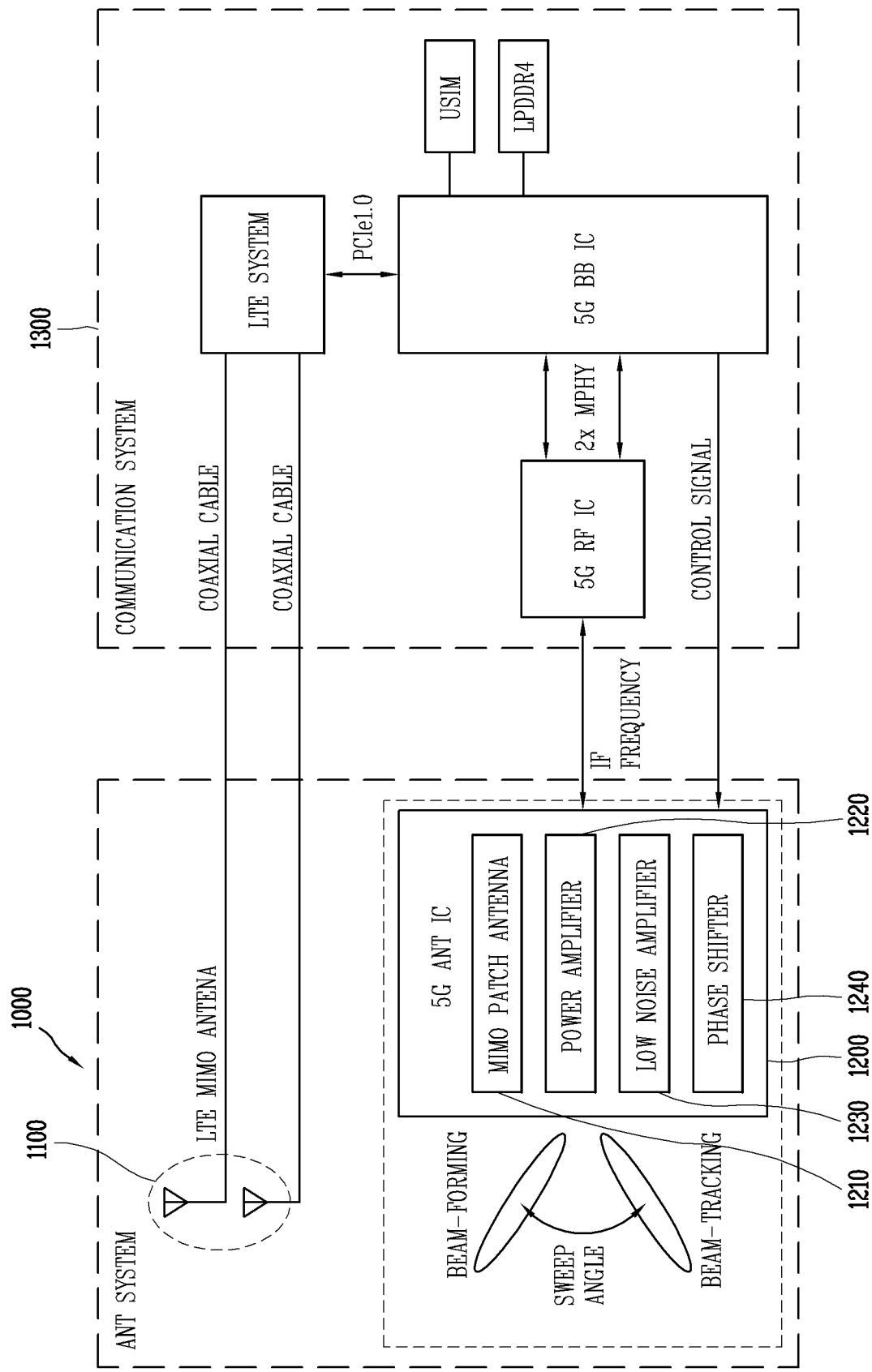
FIG. 3 is a view illustrating a detailed configuration of an antenna system including a communication module and an antenna module according to the present invention.

Meanwhile, FIG. 3 is a view illustrating a detailed configuration of an antenna system including a communication module and an antenna module according to the present invention.

As illustrated in FIG. 3, the antenna system 1000 includes first and second communication systems (or first and second antenna systems) 1100 and 1200, which are each coupled to a communication system 1300. Here, the communication system 1300 may be referred to as a telematics module or a communication module. Meanwhile, the communication system 1300 may be related to the communication device 400 illustrated in FIG. 2, more specifically, the wireless communication unit 460. The communication system 1300 may operate based on information input from the user interface apparatus 200 and may display information received through the communication system 1300 on the user interface apparatus 200.

In addition, the communication system 1300 may control the object detection apparatus 300 to perform a specific operation, and may operate based on information received from the object detection apparatus 300.

Meanwhile, a link connection state between the first and second antenna systems 1100 and 1200 will be described below. According to one embodiment, the first communication system 1100 and the second communication system 1200 may be configured to maintain a dual connectivity state. At this time, a first signal may be received from the second communication system 1100 when a second signal is not received from the second communication system 1200. That is, since the first communication system 200 always maintains the connection state even when a link connection with a base station is released in the second communication system 1200, the second signal may be received from the second communication system 1200. According to another embodiment, when the link connection through the second communication system 1200 is released, a fall back mode in which a connection with the first communication system 1100 is initiated is also activated. Here, the first and second communication systems may be an LTE communication system and a 5G communication system, respectively, but are not limited thereto and can be freely changed according to applications.

The first antenna system 1100 may be configured to exchange radio signals with existing mobile communication systems (2G/3G/4G) and include a plurality of antenna elements 1110. The first antenna system 1100 may operate in a MIMO mode to receive a plurality of stream signals from a base station via the plurality of antenna elements. In this regard, the plurality of antennas may be two or four antennas, and the first antenna system 1100 may support 2×2 and 4×4 MIMO modes. In this case, the 2×2 and 4×4 MIMO modes correspond to a case where one terminal (vehicle) receives two stream signals and four stream signals transmitted from the base station, respectively. As described above, a case where a single terminal (vehicle) receives a plurality of streams from a base station may be referred to as a single user (SU)-MIMO mode. On the other hand, a case where a plurality of terminals (vehicles) receives the plurality of streams, respectively, may be referred to as an MU-MIMO mode. In order to support the SU-MIMO mode, the first antenna system 1100 must include a plurality of antenna elements.

The second antenna system 1200 may include 1210, a power amplifier 1220, a low noise amplifier (LNA) 1230, and a phase shifter 1240. On the other hand, the second antenna system 1200 may be configured to operate in a frequency band of 28 GHz, a frequency band of 20, 30, 60 GHz, or a sub-6 frequency band below 6 GHz.

The antenna 1210 may be disposed on a dielectric substrate in the form of a patch antenna. For example, the patch antenna 110 may be implemented in the form of a microstrip in which a radiating element and a ground plane are disposed on a top surface and a bottom surface of a dielectric substrate, respectively.

In the case of being configured as the array antenna of the second antenna system 1200, phase values applied to each element of the array antenna are controlled through the phase shifter 1240 to perform beamforming (beam-scanning). For example, the beamforming may be performed within a specific angular range in an azimuth direction and an elevation direction. In this regard, the second antenna system 1200 may generate a null pattern of a beam in an interference signal direction while performing beamforming in a desired direction of the azimuth and elevation directions according to the change of the phase values by the phase shifter 1240. Meanwhile, the antenna 1210 may operate as a single antenna element by applying power only to one of the plurality of antenna elements of the array antenna.

That is, in relation to the antenna 1210, the configuration of the array antenna and the single antenna element may be variably configured according to power-on/off and a circuit configuration capable of supporting it. Therefore, when the signal level (or signal-to-interference ratio) is sufficient by virtue of a sufficiently close distance with the base station or another communication target device, the patch antenna 110 is variably configured as a single antenna element. On the other hand, when the signal level (or signal-to-interference ratio) is not sufficient, the antenna 1210 is variably configured as an array antenna.

The antenna 1210 may operate simultaneously as a transmission antenna for radiating a transmission signal from the power amplifier 1220 into a free space and a reception antenna for transferring a reception signal from the free space to the low noise amplifier 1230. Accordingly, the antenna 1210 is configured to operate in both a transmission frequency band and a reception frequency band.

The power amplifier 1220 amplifies a signal from a 5G RF IC and transmits the signal through the patch antenna 100. In this regard, the power amplifier 120 may include a frequency up-converter that receives an intermediate frequency (IF) band signal from the 5G RF IC and converts the received signal into a radio frequency (RF) band signal.

The low noise amplifier 1230 performs low-noise amplification for a signal received through the antenna 1210 and transmits the amplified signal to the 5G RF IC. In this regard, the low-noise amplifier 1230 may include a frequency down-converter that downwardly converts the RF signal of 28 GHz to an IF signal.

On the other hand, when the patch antenna 1210 is configured as an array antenna, the phase shifter 1240 is configured to apply a different phase to each of the elements of the array antenna. In this regard, the phase shifter 1240 is configured to operate in both the transmission frequency band and the reception frequency band. The phase shifter 1240 may adjust a phase in an analog or digital manner. In this regard, the phase shifter 1240 may receive a control signal for a phase control from the 5G BB IC. Also, since an insertion loss is caused due to an internal element, the phase shifter 1240 may control a phase of a signal received from the low-noise amplifier 1230. That is, the phase shifter 1240 may perform the phase control for the signal received in the second antenna system 1200 after the low-noise amplification of the signal through the low-noise amplifier 1230.

The communication system 1300 includes an LTE system which is interfaced with the first antenna system 1100, and a 5G RF IC which is interfaced with the second antenna system 1200. Meanwhile, the LTE system may include a 3G system to support 3G WCDMA fallback or a 2G system. At this time, the first antenna system 1100 may be interfaced with the LTE system through an RF cable or a coaxial cable.

In addition, the communication system 1300 may further include a 5G BB (Base Band) IC, an USIM, and an LPDDR4. Here, the 5G BB IC exchanges baseband signals with the first and second communication systems 1100 and 1200. Here, the 5G BB IC may be interfaced with the 5G RF IC through a 2×MPHY interface, and may be interfaced with the LTE system through a PCIe 1.0 interface. The USIM and the LPDDR4 correspond to a mobile communication user identification module and a memory, respectively.

Meanwhile, since the first antenna system 1100 operates in a lower frequency band than the second antenna system 1200, a wider arrangement interval is required for an independent operation between antenna elements. This is because isolation between the antenna elements is particularly important for operating the antenna elements in the MIMO mode.

Figure 4:
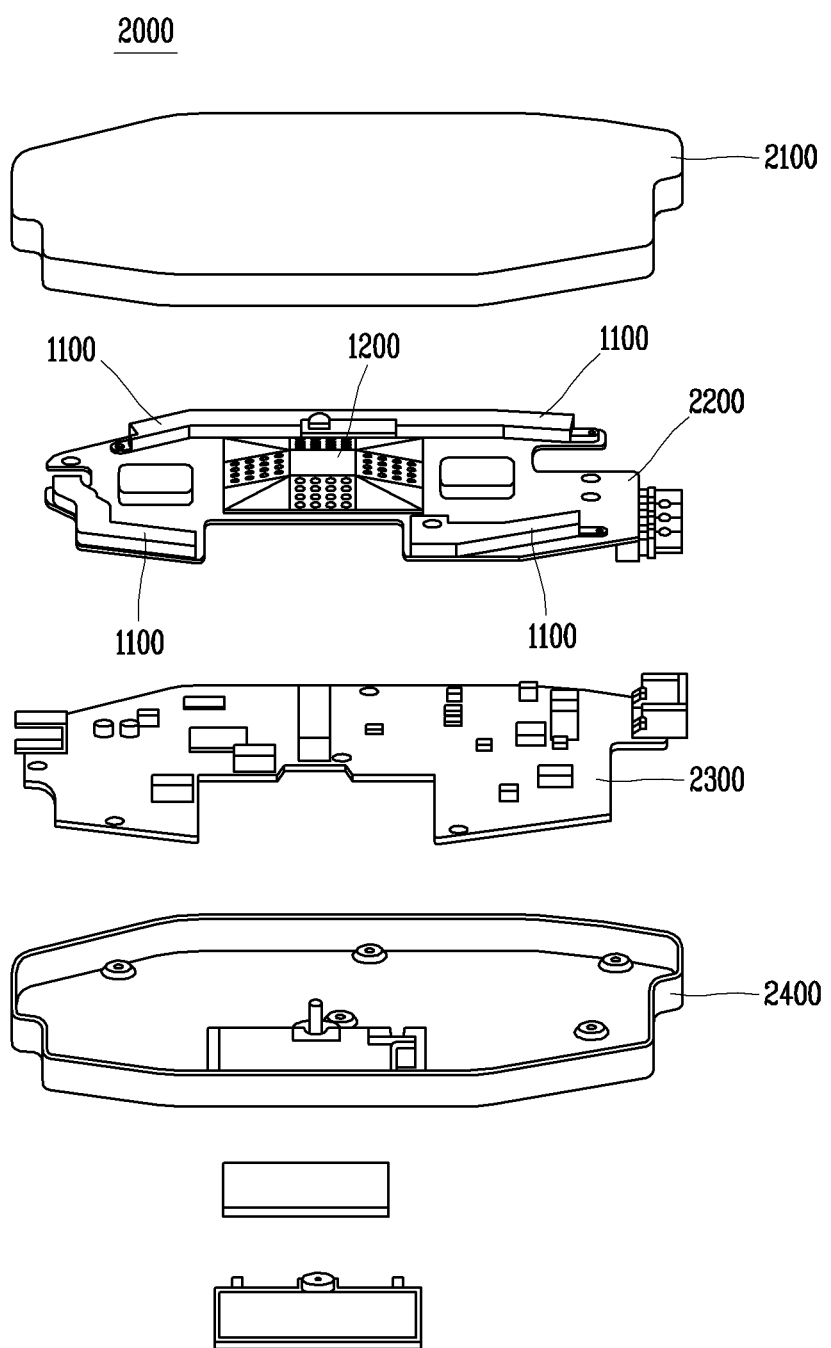
FIG. 4 is an exploded view of an antenna system loaded in a vehicle according to the present invention.
Figure 5:
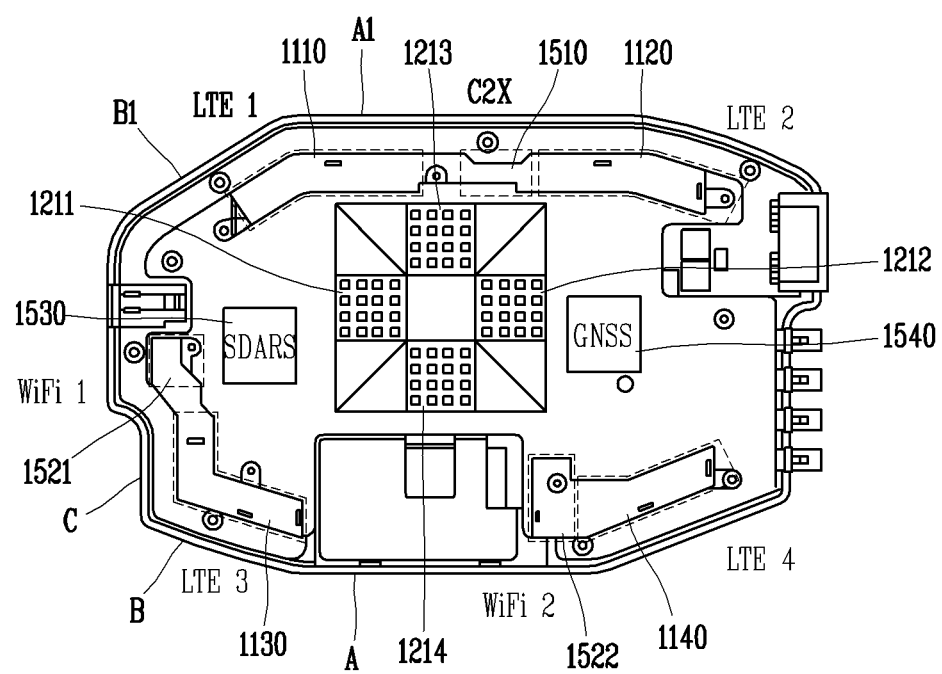
FIG. 5 is a view illustrating a configuration in which an antenna is disposed on an antenna PCB of a vehicle antenna system according to the present invention.

Meanwhile, FIGS. 4 and 5 show an antenna loaded in a vehicle according to the present invention. In detail, FIG. 4 is an exploded view of an antenna system loaded in a vehicle according to the present invention. As illustrated in FIG. 4, an antenna system 2000 loaded in a vehicle includes a top cover 2100, an antenna Printed Circuit Board (PCB) 2200, a main PCB 2300, and a bottom cover 2400. The antenna PCB 2100 includes a millimeter wave antenna 1200 disposed at a central portion, and LTE antennas 1100 disposed around the millimeter wave antenna 1210. Here, the LTE antenna 1100 and the millimeter wave antenna 1210, which is a 5G antenna, may be referred to as a first antenna 1100 and a second antenna 1210, respectively.

Meanwhile, referring to FIGS. 3 and 4, first and second antenna systems 1100 and 1200 may be configured as follows. The first antenna system 1100 performs MIMO by use of a plurality of first antenna elements which are configured to transmit and receive a first signal according to a first communication system. On the other hand, the second antenna system 1200 performs beam-forming by use of a plurality of second antenna elements which are configured to transmit and receive a second signal according to a second communication system.

FIG. 5 is a view illustrating a configuration in which an antenna is disposed on an antenna PCB of a vehicle antenna system according to the present invention. Referring to FIGS. 4 and 5, the first antenna system 1100 may perform 4×4 MIMO. To this end, a plurality of first antenna elements 1110 to 1140 may be disposed at a left upper end, a right upper end, a left lower end, and a right lower end of the PCB. At this time, the MIMO operation such as 4×4 MIMO may be performed by the first antenna system 1100 or by the second antenna system 1200 using a Sub-6 GHz band.

Therefore, the vehicle antenna according to the present invention is characterized in that the LTE antenna 1100 and the millimeter wave antenna 1210 as the 5G antenna are disposed on the same circuit board, that is, the antenna PCB 2200. At this time, since a plurality of first to fourth antenna elements 1110 to 1140 corresponding to the LTE antenna 1100 and a plurality of array antennas are arranged in a limited space of the same circuit board, it is important to ensure isolation between them.

Meanwhile, the plurality of first antenna elements 1110 to 1140 may be referred to as first to fourth LTE antennas 1110 to 1140. At this time, the first and second LTE antennas 1110 and 1120 disposed at a left upper end and a right upper end of the circuit board may be symmetrical with respect to a center line between them. Meanwhile, interference between the first and second LTE antennas 1110 and 1120 may be determined sensitively to a distance between them. Accordingly, a feeding form of the first and second LTE antennas 1110 and 1120 may be an off-center form in which isolation is improved as feeding points of the first and second LTE antennas 1110 and 1120 are spaced far apart from each other. At this time, the first and second LTE antennas 1110 and 1120 may be in a form of using a ground surface such as a PIFA or monopole type for miniaturization. Meanwhile, in addition to the off-center feeding form, the first and second LTE antennas 1110 and 1120 may optimize a form of a ground of the antenna PCB 2200 in order to improve mutual isolation. To this end, a portion of a ground surface of a lower surface of the antenna PCB 2200 may be removed. Specifically, isolation among the first to fourth LTE antennas 1110 to 1140 may be improved by a structure in which the ground surface is removed into a periodic structure having a predetermined length and width on the lower surface of the antenna PCB 2200. Meanwhile, the periodic structure having the predetermined length and width may be a photonic band gap (PBG) or an electromagnetic band gap (EBG) structure.

The plurality of first antenna elements 1110 to 1140 may include an antenna and a communication module for other connectivity in addition to the first to fourth LTE antennas 1110 to 1140. In this regard, Table 1 shows in detail a number and type, a frequency band, and an arrangement of WiFi, C2X, SDARS, and GNSS antennas as well as LTE and mmWave.

TABLE 1

| Connectivity | Number of antennas | Antenna type | Frequency band | Arrangement feature |
|---|---|---|---|---|
| LTE | 4 EA | PIFA or Monopole | B20, B5, B3, B1, B7, B38 | Considering isolation, LTE antennas are placed at four corners. |
| WiFi | 2 EA | | 2400-2480 Hz | Considering isolation, WiFi and |
| C2X | 1 EA | | 5850-5925 Hz | C2X antennas are placed between neighboring LTE antennas. |
| SDARS | 1 EA | Patch | 2320-2345 Hz | SDARS and GNSS antennas are |
| GNSS | 1 EA | | 1575-1608 Hz | patch-type antennas, and located at left and right sides of a center. |
| mmWave | 4 arrays | Patch array | 28 GHz band | A plurality of array antennas are arranged at a central region separately from each other. |

Specifically, it may further include a C2X antenna 1510 disposed between regions where the first and second LTE antennas 1110 and 1120 are disposed. The C2X antenna 1510 is an antenna for performing C2X communication, and a C2X operating frequency band may be different from an LTE operating frequency band. Accordingly, even if the C2X antenna 1510 is disposed between the first and second LTE antennas 1110 and 1120, mutual interference does not occur, and thus deterioration of isolation is not caused.

In addition, the third and fourth LTE antennas 1130 and 1140 disposed at the left lower end and the right lower end of the circuit board may be disposed in a different form from the first and second LTE antennas 1110 and 1120. In this regard, a size of the antenna PCB 2200 disposed inside the vehicle antenna system 2000 is limited, and its size is limited particularly in width in a vertical direction.

In this regard, FIG. 6 is a view illustrating isolation between a plurality of LTE antennas according to the present invention. Referring to FIGS. 5 and 6, it can be seen that isolation S31, which is isolation between the first LTE antenna 1110 and the third LTE antenna 1130, is deteriorated in comparison with isolation between other antennas.

In this regard, at least one of the third and fourth LTE antennas 1130 and 1140 may be arranged to be partially shifted to the left or right relative to the first and second LTE antennas 1110 and 1120. In particular, unlike the first LTE antenna 1110, the third LTE antenna 1130 may be disposed in a curved region B and a left region C rather than a linear region A of a lower end portion. On the other hand, the first LTE antenna 1110 may be disposed in a linear region A1 and a curved region B1 of an upper end portion.

In addition, a structure in which a ground surface is removed into a periodic structure having a predetermined length and width may be disposed on the lower surface of the antenna PCB 2200, particularly, on a path between the first LTE antenna 1110 and the third LTE antenna 1130. In this regard, a structure from which the ground surface has been removed may be disposed at a predetermined period on a current path between the first LTE antenna 1110 and the third LTE antenna 1130. At this time, a size and a predetermined period of the periodic structure having the predetermined length and width can be expressed by a specific wavelength in an operating frequency band. At this time, the periodic structure having the predetermined length and width may be a photonic band gap (PBG) or an electromagnetic band gap (EBG) structure. The PBB or EBG structure may be disposed at a predetermined period based on a point where a higher-order mode component rather than a dominant mode component among radiation components of the first LTE antenna 1110 and the third LTE antenna 1130 appears greatly.

On the other hand, first and second WiFi antennas 1521 and 1522 may be disposed at a left center and a lower center of the circuit board. In this regard, a WiFi frequency band is different from an LTE frequency band and a 5G frequency band. Therefore, the first and second WiFi antennas 1521 and 1522 are not affected by interference with the first to fourth LTE antennas 1110 to 1140 and the first to fourth array antennas 1211 to 1214 corresponding to the 5G antennas. On the other hand, interference between the first and second WiFi antennas 1521 and 1522 is further reduced by arrangement of antennas having different frequency bands.

Meanwhile, a plurality of second antenna elements of the second antenna system 1200 may be configured in a form of first to fourth array antennas 1211 to 1214. Specifically, the first to fourth array antennas 1211 to 1214 may be disposed at a center region of the circuit board surrounded by the first to fourth LTE antennas 1110 to 1140. Accordingly, the first to fourth array antennas 1211 to 1214 may be disposed at a left center, a right center, an upper center, and a lower center, respectively, so as to cover predetermined regions in an azimuth direction. Meanwhile, in the 5G communication system, it is necessary to transmit and receive beams at an elevation angle of a proper height to perform communication with a nearby base station or a nearby object. To this end, the first to fourth array antennas 1211 to 1214 may be disposed at a left center, a right center, an upper center, and a lower center, respectively, on a structure having a predetermined inclination.

At this time, beam-forming may be performed using only one of the first to fourth array antennas 1211 to 1214. However, the present invention is not limited to this, and a MIMO operation may alternatively be performed using two or more of the first to fourth array antennas 1211 to 1214.

The vehicle antenna system 2000 may further include an SDARS antenna 1530 and a GNSS antenna 1540 which are spaced apart by predetermined distances from the first and second array antennas 1211 and 1212 disposed at the left center and the right center, respectively.

Meanwhile, when a signal is received through the GNSS antenna 1540, the first to fourth LTE antennas 1110 to 1140 may set transmission power of a first signal (LTE signal) to a threshold value or less. An LTE signal transmission may not be performed when a GPS signal is received through the GNSS antenna 1540. Or, if the LTE signal transmission is needed, LTE backoff may be performed that lowers an interference level by lowering a transmission power level. In this way, when a plurality of signals are received at the same time, priorities of those signals in consideration of mutual interference are as follows. For example, priorities may be determined in the order of GNSS→V2X (or C2X)→LTE.

Meanwhile, since signal transmission among the first and second WiFi antennas 1521 and 1522, the SDARS antenna 1530, and the GNSS antenna 1540 is blocked by the interposed 5G antenna structures, mutual isolation can be enhanced.

Referring to FIGS. 3 to 5, the first and second antenna systems 1100 and 1200 are disposed on a circuit board of a polygonal structure, that is, the antenna PCB 2200. Specifically, the first and second antenna systems 1100 and 1200 are disposed on a side surface and a center of the antenna PCB 2200.

Figure 7:
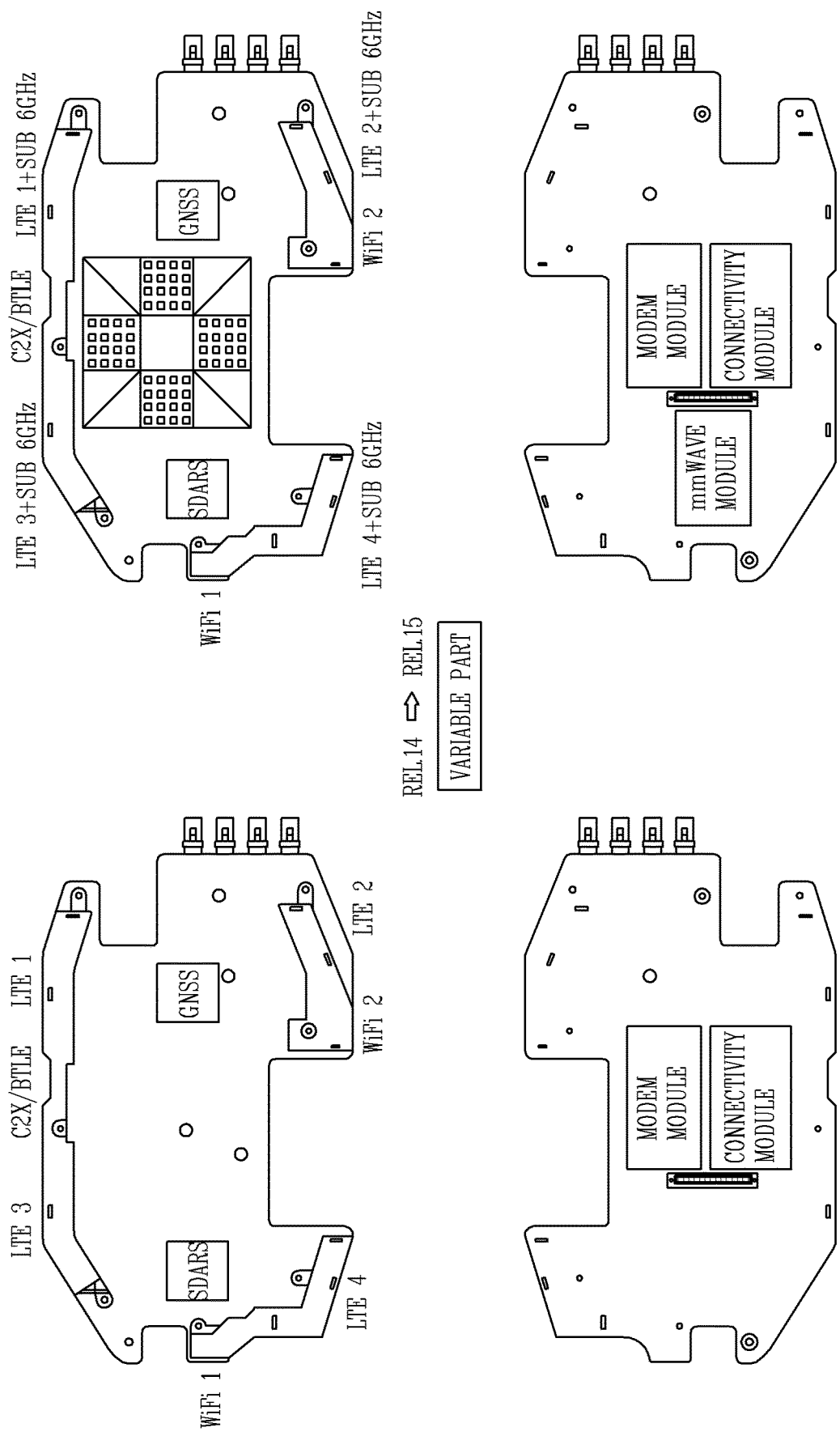
FIG. 7 is a view illustrating a module disposed on an upper surface and a lower surface of an antenna PCB in accordance with one embodiment of the present invention.

Meanwhile, FIG. 7 is a view illustrating modules disposed on an upper surface and a lower surface of an antenna PCB in accordance with one embodiment of the present invention. In case of supporting 3GPP standard Rel. 14, an LTE antenna, a C2X antenna, a WiFi antenna, an SDARS antenna, and a GNSS antenna are disposed on an upper surface of the antenna PCB. On the other hand, in case of supporting 3GPP standard Rel. 15, a 5G antenna of a millimeter wave (mmWave) band is further disposed on a center of the upper surface. In addition, the LTE antenna may operate as a 5G antenna of sub-6 GHz of a 6 GHz band or less.

On the other hand, an integrated module may be disposed on a rear surface of the antenna PCB. The integrated module may include a modem module and a connectivity module, as illustrated in FIG. 7. On the other hand, in case of supporting 3GPP standard Rel. 15, a millimeter wave (mmWave) module may further be disposed. Accordingly, the vehicle antenna system can be configured to be further provided with the 5G antenna and the modules according to whether or not a signal antenna system supports 3GPP standard Rel. 15.

Meanwhile, FIG. 8 shows an internal structure of a vehicle antenna system in accordance with various embodiments of the present invention. A vehicle antenna system may have a polygonal structure as shown in FIG. 8A or a basic structure as shown in FIG. 8B. Also, the vehicle antenna system may be configured as an extended structure of FIG. 8C which extends from the basic structure of FIG. 8C. By implementing the vehicle antenna system in such various structures, more than ten antenna elements and a connectivity device for a next generation telemetry control unit (TCU) can be integrated with each other. The vehicle antenna system may further include a communication module and a sub 6 Hz 5G NR module in addition to 4×4 MIMO antenna.

Figure 8A:
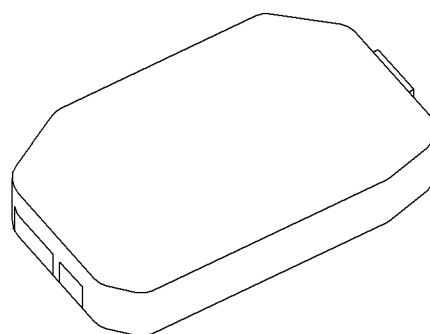
FIGS. 8A to 8C are views illustrating an internal structure of a vehicle antenna system in accordance with various embodiments of the present invention.
Figure 8A:
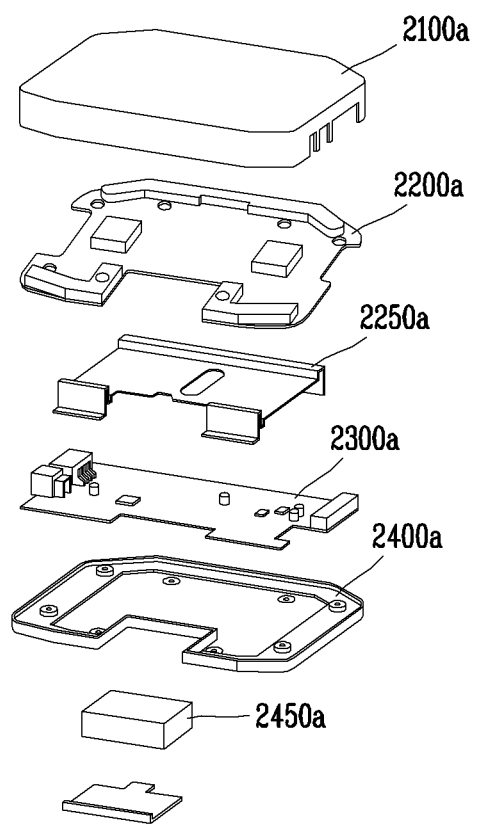
Figure 8B:
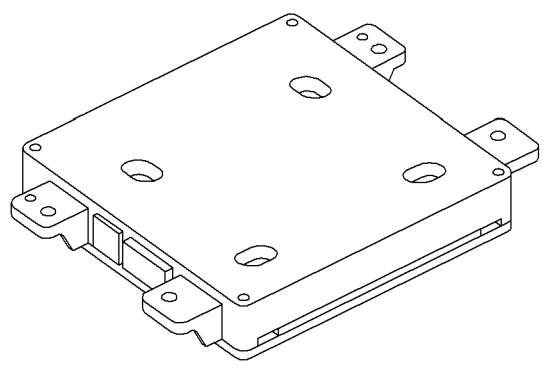
Figure 8B:
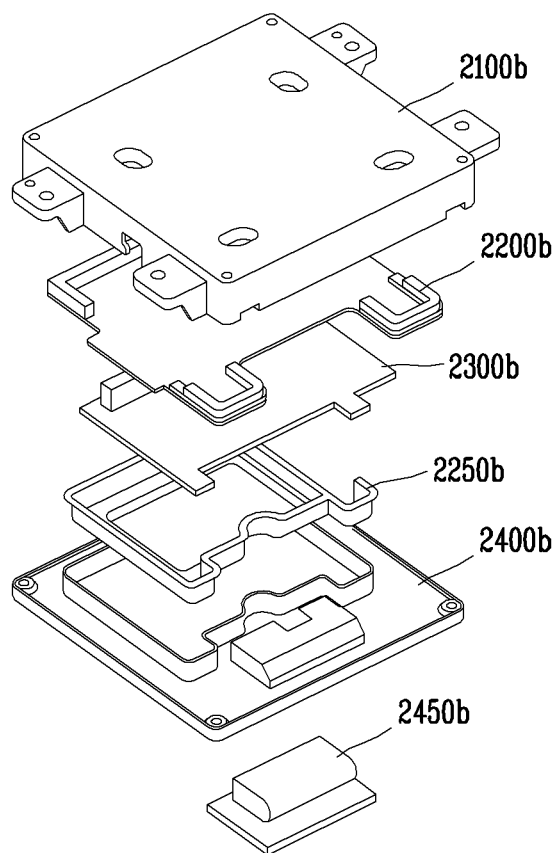

In this regard, for example, 9 to 14 antenna elements may be arranged in the polygonal structure as illustrated in FIG. 8A. On the other hand, for example, up to 10 antenna elements may be arranged in the basic structure as illustrated in FIG. 8B. On the other hand, for example, or more antenna elements may be disposed in an extended structure as illustrated in FIG. 8C.

Referring to FIG. 8A, a top cover 2100a, an antenna PCB 2200a, a heat sink 2250a, a main PCB 2300a, and a bottom cover 2400a may be sequentially disposed. A backup battery 2450a may be disposed on the bottom cover 2400a.

Referring to FIG. 8B, a top cover 2100b, an antenna PCB 2200b, a main PCB 2300b, a heat sink 2250b, and a bottom cover 2400b may be sequentially disposed. A backup battery 2450b may be disposed on the bottom cover 2400b.

Figure 8C:
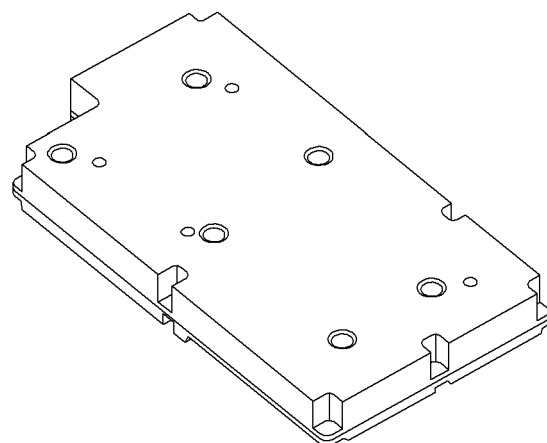
Figure 8C:
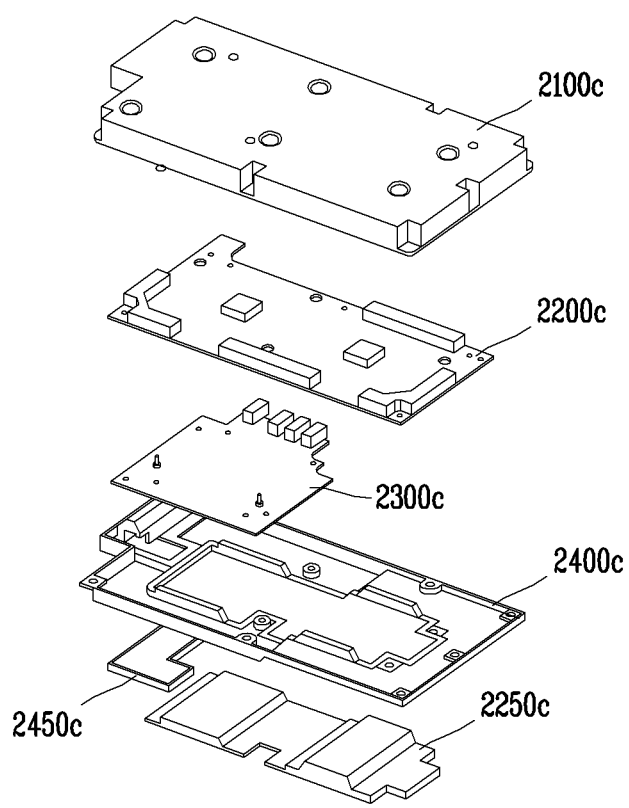

Referring to FIG. 8C, a top cover 2100c, an antenna PCB 2200c, a main PCB 2300c, a bottom cover 2400c, and a heat sink 2250c may be sequentially disposed. A backup battery 2450c may be disposed on the bottom cover 2400c.

Thus, referring to FIGS. 8A to 8C, the top cover 2100a, 2100b, 2100c is disposed on an upper portion of the antenna PCB 2200a, 2200b, 2200c, and the main PCB 2300a, 2300b, 2300c is disposed on a lower portion of the antenna PCB 2200a, 2200b, 2200c. On the other hand, the bottom cover 2400a, 2400b, 2400c is disposed on a lower portion of the main PCB 2300a, 2300b, 2300c, and the backup battery 2450a, 2450b, 2450c may be detachably disposed on the bottom cover 2400a, 2400b, 2400c.

Here, the antenna PCB 2200a, 2200b, 2200c may further include a modem processor, a Bluetooth (BT)/WiFi module and a C2X module in addition to the first antenna system 1100 and the second antenna system 1200 described above. At this time, the antenna PCB 2200a, 2200b, 2200c may also be referred to as an antenna and communication board.

The main PCB 2300a, 2300b, 2300c controls communication modules disposed on the antenna PCB, and modules which are interfaced with the communication modules are disposed on the main PCB. In detail, the main PCB may include an application processor (AP), an Ethernet switch, a power management unit, and a vehicle network connector. At this time, the main PCB 2300a, 2300b, 2300c may also be referred to as an AP board.

Also, the antenna system may include a 2×2 LTE MIMO input port and a C2X antenna port, which are wireless interfaces. The antenna system may also include an Ethernet interface, an emergency call button interface, an airbag interface, an emergency call speaker interface, and a microphone interface, which are wired interfaces.

On the other hand, the antenna system provided in a vehicle as illustrated in FIGS. 8A to 8C may be disposed on a roof of the vehicle or in a roof structure of the vehicle. At this time, at least part of the roof structure may be made of a nonmetal.

Hereinafter, a vehicle antenna system including a plurality of first antenna elements and a plurality of array antennas according to another aspect of the present invention will be described. The description of the aforementioned vehicle antenna system is also applicable to a vehicle antenna system including a plurality of first antenna elements and a plurality of array antennas to be described later.

In this regard, referring back to FIG. 5, the plurality of first antenna elements 1110 to 1140 are configured to transmit and receive a first signal according to a first communication system. At this time, the first to fourth antenna elements 1110 to 1140 may also be referred to as first to fourth LTE antennas 1110 to 1140.

Referring to FIG. 5, a plurality of array antennas correspond to first to fourth array antennas 1211 to 1214, respectively. At this time, the plurality of first antenna elements 1110 to 1140 and the plurality of array antennas 1211 to 1214 may be disposed on an antenna PCB which is the same circuit board. Specifically, the plurality of first antenna elements may include first to fourth LTE antennas 1211 to 1214, and perform 4×4 MIMO with a base station.

Referring to FIGS. 5 to 7, the first to fourth LTE antennas 1211 to 1214 may be disposed at a left upper end, a right upper end, a left lower end, and a right lower end. At this time, a distance between the adjacent antennas can be maximized, and some antennas can be arranged so as to be shifted in distance, thereby enhancing isolation among those antennas. In addition, the isolation characteristics can be improved in an off-center feeding manner among the first to fourth LTE antennas 1211 to 1214. Meanwhile, the above-mentioned contents may be applied in relation to a detailed arrangement structure of the various antennas including the first to fourth LTE antennas 1211 to 1214.

Accordingly, referring to FIG. 5, the first and second LTE antennas 1110 and 1120 disposed at the left upper end and the right upper end of the antenna PCB 2200 may be symmetrical with respect to a center line between the first and second LTE antennas 1110 and 1120. On the other hand, a feeding form of the first and second LTE antennas 1110 and 1120 may be an off-center form in which isolation is improved as feeding points of the first and second LTE antennas 1110 and 1120 are spaced far apart from each other.

Accordingly, at least one of the third and fourth LTE antennas 1130 and 1140 disposed at the left lower end and the right lower end of the antenna PCB 2220 may be partially shifted to the left or right relative to the first and second LTE antennas 1110 and 1120. Therefore, unlike the first LTE antenna 1110, the third LTE antenna 1130 may be disposed in a curved region B and a left region C rather than a linear region A of a lower end portion. On the other hand, the first LTE antenna 1110 may be disposed in a linear region A1 and a curved region B1 of an upper end portion.

On the other hand, the first to fourth array antennas 1211 to 1214 operating in a 5G frequency band, specifically, a millimeter wave (mmWave) band may be disposed in a center region of the antenna PCB 2200 surrounded by the first to fourth LTE antennas 1110 to 1140. At this time, the first to fourth array antennas 1211 to 1214 may be disposed at a left center, a right center, an upper center, and a lower center, respectively, so as to cover predetermined regions in an azimuth direction.

The plurality of first antenna elements 1110 to 1140 and the plurality of array antennas 1211 to 1214 may be disposed on the antenna PCB 2200 corresponding to the PCB having the polygonal structure. At this time, an integrated module may be disposed on a rear surface of the antenna PCB 2200, and a modem module, a connectivity module, and a millimeter wave module may be disposed in the integrated module.

The top cover 2100 may be disposed on an upper portion of the antenna PCB 2200 and the main PCB 2300 may be disposed on a lower portion of the antenna PCB 2200. Also, the bottom cover 2400 may be disposed on a lower portion of the main PCB 2300 and a backup battery may be detachably disposed on the lower cover 2400.

The foregoing description has been given of an antenna system which includes first and second antenna systems and is loaded in a vehicle, and an antenna system which includes a plurality of antenna elements and a plurality of array antenna and is loaded in a vehicle.

With the configuration and the antenna arrangement structure, the present invention can provide a flat type vehicle antenna capable of providing not only existing mobile communication services but also next generation communication services, and a control method thereof.

According to at least one embodiment of the present invention, an antenna arrangement structure with optimized isolation characteristics among antenna elements can be provided in a flat type vehicle antenna having an LTE antenna system and a 5G antenna system.

In addition, according to at least one embodiment of the present invention, the present invention provides a module-type flat vehicle antenna system in which various basic structures of the flat vehicle antenna system can extend to an extended structure.

The controller (modem or application processor) can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

What is claimed is:

1. A vehicle antenna system having an integrated communication module and configured to be disposed on or within a roof structure of a vehicle, comprising:
   a module cover including a top cover and a bottom cover, at least one of the top cover or the bottom cover being made of a dielectric material;
   an antenna printed circuit board (PCB) disposed between the top cover and the bottom cover;

a first antenna module including a plurality of first antenna elements and configured to perform Multi Input Multi Output (MIMO);

a second antenna module including one or more of an SDARS antenna, a GNSS antenna, V2X antenna, or a WiFi antenna;

a connectivity module disposed on the antenna PCB and including a first connectivity module and a second connectivity module;

a main PCB disposed between the antenna PCB and the bottom cover and configured to control the connectivity module disposed on the antenna PCB; and a heat sink that is disposed at at least one of (i) between the antenna PCB and the main PCB, (ii) between the main PCB and the bottom cover, or (iii) on a lower portion of the bottom cover, wherein the first antenna module and the second antenna module are disposed on the antenna PCB.

2. The vehicle antenna system of claim 1, wherein the vehicle antenna system is configured to be disposed within a recess defined by the roof structure of the vehicle.

3. The vehicle antenna system of claim 2, wherein the vehicle antenna system is configured to be covered by a dielectric cover that forms at least a part of the roof structure of the vehicle, and wherein the first antenna module and the second antenna module are configured to transmit and receive radio signals through the dielectric cover.

4. The vehicle antenna system of claim 1, wherein one of the top cover and the bottom cover is made of a dielectric material and the other of the top cover and the bottom cover includes the heat sink.

5. The vehicle antenna system of claim 4, wherein the top cover is made of a dielectric material, the first antenna module and the second antenna module being configured to transmit and receive radio signals through the dielectric material, and wherein the heat sink is made of a metal material and is disposed at the bottom cover.

6. The vehicle antenna system of claim 1, wherein the first connectivity module corresponds to the first antenna module and the second connectivity module corresponds to the second antenna module, and wherein the first and second connectivity modules are disposed on the antenna PCB.

7. The vehicle antenna system of claim 1, wherein the first and second antenna modules and the first and second connectivity modules are disposed on the same antenna PCB.

8. The vehicle antenna system of claim 1, wherein the first antenna module is electrically connected with the first connectivity module, and the second antenna module is electrically connected with the second connectivity module.

9. The vehicle antenna system of claim 1, wherein the antenna PCB has a plurality of side surfaces that form a polygonal shape, and wherein at least a portion of a side surface of each of the plurality of first antenna elements is aligned with at least a portion of a side surface of the antenna PCB.

10. The vehicle antenna system of claim 1, wherein the plurality of first antenna elements include first, second, third, and fourth antenna elements, wherein the first and second antenna elements of the first antenna module are disposed at opposite ends along a first direction of the antenna PCB, and wherein the third and fourth antenna elements of the first antenna module are disposed at opposite ends along the first direction of the antenna PCB.

11. The vehicle antenna system of claim 10, wherein the first and third antenna elements of the first antenna module are disposed at opposite ends along a second direction of the antenna PCB that is transverse to the first direction, and wherein the second and fourth antenna elements of the first antenna module are disposed at opposite ends along the second direction of the antenna PCB.

12. The vehicle antenna system of claim 1, wherein the plurality of first antenna elements include:

a first antenna element disposed at a left upper end of the antenna PCB;

a second antenna element disposed at a right upper end of the antenna PCB;

a third antenna element disposed at a left lower end of the antenna PCB, the third antenna element being positioned leftward of the first antenna element; and a fourth antenna element disposed at a right lower end of the antenna PCB, the fourth antenna element being positioned rightward of the second antenna element.

13. The vehicle antenna system of claim 1, wherein the plurality of first antenna elements include first, second, third, and fourth antenna elements, and wherein the third and fourth antenna elements are shifted toward a left region and a right region of the antenna PCB, respectively, to thereby enhance isolation with the first and second antenna elements.

14. The vehicle antenna system of claim 1, wherein the plurality of first antenna elements include first, second, third, and fourth antenna elements that are placed at corresponding corners of the antenna PCB.

15. The vehicle antenna system of claim 1, wherein the first antenna module is configured to operate as a 5G antenna in a sub-6 GHz band of 5G NR.

16. The vehicle antenna system of claim 1, wherein the first antenna module is configured to perform 2×2 MIMO or 4×4 MIMO using two or more antenna elements in a sub-6 GHz band of 5G NR or in an LTE frequency band.

17. The vehicle antenna system of claim 1, wherein the plurality of first antenna elements include first, second, third, and fourth antenna elements, and wherein the second antenna module is disposed at a region of the antenna PCB that is positioned between two or more of the first, second, third, and fourth antenna elements.

18. The vehicle antenna system of claim 1, wherein the second antenna module includes the GNSS antenna and the SDAS antenna, the GNSS antenna and the SDAS antenna being spaced apart from each other by a predetermined distance.

19. The vehicle antenna system of claim 18, wherein one of the GNSS antenna and the SDAS antenna is disposed at a left center region of the antenna PCB and the other of the GNSS antenna and the SDAS antenna is disposed at a right center region of the antenna PCB.

20. The vehicle antenna system of claim 1, wherein the heat sink is disposed between the antenna PCB and the main PCB, and wherein the antenna PCB is disposed between the top cover and the heat sink, and wherein the main PCB is disposed between the heat sink and the bottom cover.

* * * * *